May 10, 1966 J. DENIS ETAL 3,250,890
METHODS OF SEAM WELDING OF ELEMENTS OF RIGID PANELS, AND
THE CORRESPONDING WELDING MACHINE
Filed July 28, 1964 2 Sheets-Sheet 2

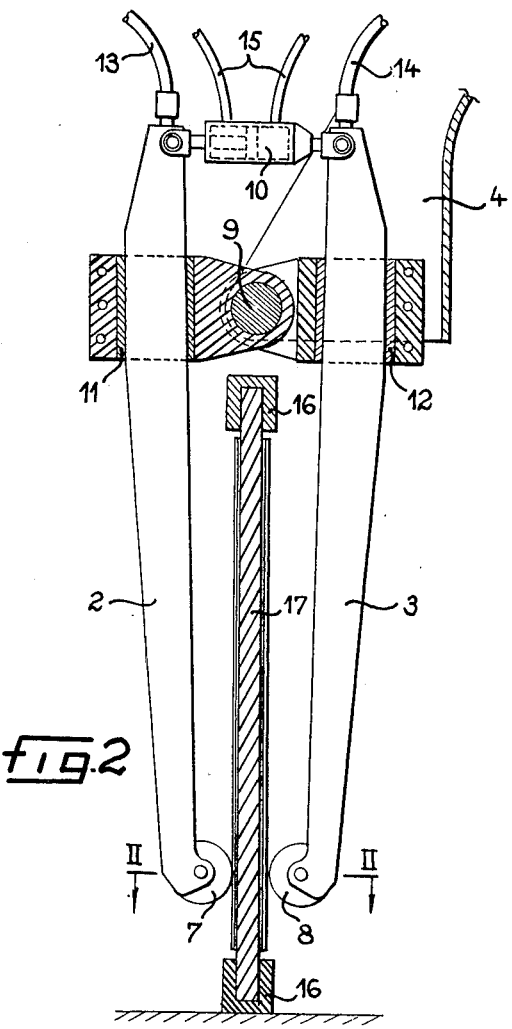
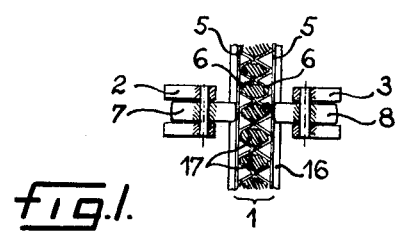

INVENTORS
Jean Denis &
Jean Pierre Morland

BY Karl W. Flocks

ATTORNEY

United States Patent Office 3,250,890
Patented May 10, 1966

3,250,890
METHODS OF SEAM WELDING OF ELEMENTS OF RIGID PANELS, AND THE CORRESPONDING WELDING MACHINE
Jean Denis, Antony, and Jean Pierre Morland, Clamart, France, assignors to Nord-Aviation Societe Nationale de Constructions Aeronautiques, Paris, France, a joint-stock company of France
Filed July 28, 1964, Ser. No. 385,642
Claims priority, application France, Oct. 31, 1963, 952,505
3 Claims. (Cl. 219—82)

The present invention relates to an improvement in methods of assembly of the elements entering into the composition of rigid panels and in particular into the composition of panels of the sandwich type. It also relates to the welding machine by which the said method is carried into effect and includes, by way of new industrial products, all the panels obtained with the said machine while carrying the said method into effect.

These panels are currently employed in the aeronautical and space industries.

The production of panels of this kind necessitates the assembly to each other of a number of elements, some corrugated and the others smooth. They are obtained from sheets of different metals, the thickness of which is of the order of a few hundredths or tenths of millimetres. Their assembly is effected by electric seam welding using wheel electrodes.

When welding machines such as exist at the present time are employed to effect these welds, in which machines the welding arms are fixed, the following difficulty is encountered. If, as a result of defects of flatness of the outer faces of the panel during the course of assembly, or, by reason of its own weight and of the weight of its support or supports, of irregularities in its guiding, the pressure applied by one of the wheel electrodes on one of the faces of the panel is different from the pressure applied on the other face by the other wheel; the volume of the molten ingot, which should be a maximum at the point of junction, tends to diminish and then to become zero as and when the point of the outer face of the panel is approached which is subjected to the highest pressure. Since the metallic sheets which constitute the elements to be assembled to each other are very thin, an even small variation of the position of the ingot as a result of a difference between the pressure applied by the two wheel electrodes, results in a bad weld.

Attempts have been made to correct this fault by utilizing welding wheels with variable and controlled pressure. It must however be realized that the operation and control of the small variations referred to above are difficult to effect in view of the fact that not only are the elements very thin but the clamping pressure which it is necessary to obtain between the welding wheels is of the order of 100 kgs.

In consequence, the present invention has for its object an improvement in the present methods, and the corresponding machine which enables these drawbacks to be overcome while permitting assemblies of elements of complicated shapes to be effected.

The method according to the invention consists:

In utilizing two welding arms each carrying a welding wheel at one of its extremities, the elements to be assembled to each other being arranged between these two wheels on a chassis in such manner that the weight of the said elements and their chassis has no action on the said wheels;

In pivoting each of the two welding arms about an axis, preferably horizontal, carried by the moving head of a welding machine, means being provided between the two arms so that the wheels apply a constant and adjustable pressure on the elements to be assembled;

And in placing the centre of gravity of the oscillating unit formed by the two arms, the pressure means and the accessories which are fixed to them below and vertically with respect to the suspension shaft so that the said unit is in stable equilibrium about the said suspension shaft, the pressure applied by the welding wheels on the elements to be assembled being thus independent of irregularities of surface flatness of the said elements to be assembled, and also of their weight.

The welding machine which carries into effect the above improvement is of the type comprising two welding arms rigidly fixed to its moving head, each of these arms carrying a welding wheel and the elements to be assembled to each other being placed between the two wheels, and means for causing relative movement of the element to be assembled and the wheels so that the latter carry out on the one hand an active welding travel while applying a pressure on the elements to be assembled and on the other hand a passive return travel without welding, at the end of which a fresh active travel can again take place.

It is essentially characterized in that the two welding arms, each carrying a welding wheel at one of its extremities, are individually articulated about a shaft, preferably horizontal, carried by the moving head, a jack is mounted between the two welding arms so that the wheels apply a constant and adjustable pressure on the outer faces of the elements to be assembled together, the centre of gravity of the oscillating unit constituted by the welding arms and the jack is mounted vertically and below the pivotal shaft of the said unit, in such a manner that this latter is suspended in a stable position.

Other characteristic features and advantages will be brought out in the description which follows below of preferred forms of embodiment of the invention, reference being made to the accompanying diagrammatic drawings, in which:

FIG. 1 is a cross-section taken along the line II—II of FIG. 2;

FIG. 2 is a side view partially in section, showing the two welding arms and some of their accessories and the extremity of the moving head of the welding machine, in a first form of embodiment;

Figure 3:
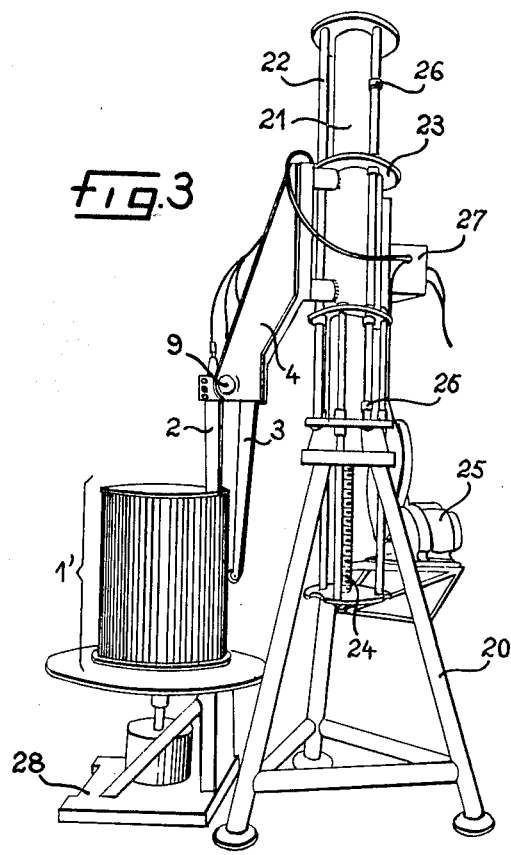
FIG. 3 is a perspective view in elevation of a second form of embodiment of the invention.

In FIGS. 1 and 2, the elements to be assembled together in order to form a flat sandwich panel 1 are arranged between two welding arms 2 and 3 rigidly fixed to the moving head 4 of a welding machine. The elements are of stainless steel and their thickness is 0.1 mm.

The elements to be assembled together are represented by two flat metal sheets 5—5 on each side of an element constituted by two corrugated metal sheets 6—6 identical to each other and previously welded together so that the hollows of one sheet coincide with the crests of the other.

The welding arms 2 and 3 each comprise a rotating wheel 7–8 at their extremities, in contact with one of the outer flat sheets 5–5 of the panel 1.

Each of the welding arms 2 and 3 is articulated about the horizontal suspension shaft 9 carried by the moving head 4 of the welding machine, and a hydraulic jack 10 is mounted between these arms.

The electrical insulation joints such as 11, 12 . . . the hydraulic cooling pipes and the electric conduits 13, 14 . . . the hydraulic conduits 15 of the jack 10 necessary for such a machine, are well-known by those skilled in the art and are only indicated here as a reminder.

The flat panel 1 in course of formation is placed in a chassis 16 of any desired type, which can for example be moved vertically with an alternating motion, having a lateral displacement corresponding to the distance between two adjacent lines of welding.

Electrodes 17 of copper may be introduced into the corrugations of the element constituted by the assembly of the corrugated sheets 6—6 in order to serve as electrical conductors and mechanical supporting members.

The operation of this welding machine is as follows:

The electrodes 17 having been placed in position and the chassis 16 moving vertically, the current is passed between the welding wheels 7 and 8 which themselves apply a pressure of the order of 100 kg. on each side of the elements of the panel 1. The flat metal sheets 5—5 are welded to the corrugated sheets 6—6. At the end of this vertical travel, the electric current and the pressure of the jack 10 being cut-off, the chassis 16 carries out the reverse travel and is displaced by a length equal to the distance between two successive corrugations of the sheets 6—6. The device is ready to recommence a further cycle.

It is obvious that the object sought by the invention is attained, namely to maintain the pressure of the welding wheels 7 and 8 constant on the elements to be assembled, by reason of the suspension in stable equilibrium of the unit constituted by the welding arms 2 and 3, the jack 10 and the accessories which are rigidly fixed thereto.

The welding machine according to the invention, in the present form of embodiment, also enables the corrugated sheets 6—6 to be assembled together so as to constitute in a first stage the intermediate element of the panel 1. The copper electrodes 17 are not essential, but on the other hand, the welding wheels 7 and 8 should have a profile adapted to the corrugations of the sheets 6—6.

In its second form of embodiment shown in FIG. 3, the welding machine enables the same assemblies to be effected as those which have been described above, but on elements which are cylindrical instead of being flat. This result is obtained by utilizing the special means described below for obtaining the desired relative displacement of the elements to be assembled to each other, so that the latter carry out an active travel and a passive return travel, both vertical, with a lateral displacement which permits the following line of welding to be effected.

These means consist of a mechanism essentially constituted by a frame 20 surmounted by a column 21, the latter carrying three guiding rods 22 on which slides a barrel 23 rigidly fixed to the moving head 4. The vertical displacement of the barrel 23 is obtained by a conventional screw-nut mechanism, of which only the screw 24 can be seen in FIG. 3, the said mechanism being driven by an electric motor 25. End-of-travel or limit switches 26 ensure the automatic forward and return action of the barrel 23. All the electric, hydraulic, etc. controls are distributed from a central location 27.

A lateral mounting device 28 ensures the placing in position of the elements of the panel 1' to be assembled together, and also their automatic displacement after each line of welding has been completed.

The welding arms 2, 3, the jack, etc., are also suspended in stable equilibrium about the shaft 9 on the moving head 4, as in the first form of embodiment.

The operation of this second form of embodiment is similar to that of the first and the same products can be obtained the only difference being that they have a straight cylindrical form instead of being flat.

It will of course be understood that the present invention has been described and illustrated solely by way of example and without any implied limitation, and that it is possible without departing from the scope of the invention to make modifications of detail both as regards the shape of the elements to be assembled and their displacements with respect to the welding wheels and also in the orientation of the said wheels.

We claim:

1. A welding machine for seam welding of elements forming constituent parts of rigid panels comprising
    a moving head mounted to move in a vertical plane,
    two welding arms carried by said head,
    a welding wheel on an extremity of each said arm with said elements to be assembled introduced between said two wheels,
    and means for producing relative displacement of said elements and said wheels to carry out an active welding travel while applying a pressure on said elements followed by a passive return travel without welding, after which a further active travel can be effected,
    a substantially horizontal shaft carried by said moving head having said two welding arms individually articulated about said shaft,
    and a jack mounted between said two welding arms to enable said wheels to apply a constant and adjustable pressure on the outer faces of said elements,
    the center of gravity of the oscillating system constituted by said welding arms and said jack being located below and vertically with respect to the pivotal shaft of said system so that said latter system is suspended in a position of stable equilibrium.

2. The welding machine of claim 1 further characterized by
    said welding wheels having profiles conforming to the outer shape of said elements when said elements are in straight corrugation form.

3. The welding machine of claim 2, further characterized by
    copper electrodes fixed in the corrugations of said elements between said welding wheels constituting electrical conductors and mechanical supporting members.

References Cited by the Examiner

UNITED STATES PATENTS

| | | | |
|---|---|---|---|
| 1,052,490 | 2/1913 | Linden et al. | 219—82 |
| 2,132,975 | 10/1938 | Shaver | 219—124 |
| 2,206,549 | 7/1940 | McIntosh et al. | 219—82 |
| 2,227,249 | 12/1940 | De Ganahl | 219—82 |
| 2,439,915 | 4/1948 | Weightman | 219—82 |

RICHARD M. WOOD, *Primary Examiner.*

B. A. STEIN, *Assistant Examiner.*